(12) United States Patent
Sakurai et al.

(10) Patent No.: US 12,174,977 B2
(45) Date of Patent: Dec. 24, 2024

(54) CENTER DEVICE ON A VEHICLE NETWORK, DATA DISTRIBUTION SYSTEM AND STORAGE MEDIUM STORING COMPUTER PROGRAM FOR DISTRIBUTION CONTROL FOR RE-PROGRAMMING ECUS

(71) Applicant: DENSO CORPORATION, Kariya (JP)

(72) Inventors: Nao Sakurai, Kariya (JP); Hideo Yoshimi, Kariya (JP)

(73) Assignee: DENSO CORPORATION, Kariya (JP)

( * ) Notice: Subject to any disclaimer, the term of this patent is extended or adjusted under 35 U.S.C. 154(b) by 495 days.

(21) Appl. No.: 17/404,372

(22) Filed: Aug. 17, 2021

(65) Prior Publication Data
US 2022/0075883 A1 Mar. 10, 2022

Related U.S. Application Data

(63) Continuation of application No. PCT/JP2020/002966, filed on Jan. 28, 2020.

(30) Foreign Application Priority Data

Feb. 22, 2019 (JP) .................................. 2019-030574

(51) Int. Cl.
*H04L 65/1043* (2022.01)
*B60W 50/04* (2006.01)
(Continued)

(52) U.S. Cl.
CPC ............. *G06F 21/62* (2013.01); *B60W 50/04* (2013.01); *B60W 50/14* (2013.01); *H04L 63/08* (2013.01);
(Continued)

(58) Field of Classification Search
None
See application file for complete search history.

(56) References Cited

U.S. PATENT DOCUMENTS

2015/0121071 A1* 4/2015 Schwarz ................. H04L 63/12
713/168
2015/0121457 A1* 4/2015 Schwarz ............... G06F 3/0484
726/3

(Continued)

FOREIGN PATENT DOCUMENTS

JP 2009080726 A 4/2009
JP 2010191786 A 9/2010

(Continued)

*Primary Examiner* — Venkat Perungavoor
(74) *Attorney, Agent, or Firm* — Harness, Dickey & Pierce, P.L.C.

(57) ABSTRACT

A center device includes: a consent request unit that is configured to make a consent request to a plurality of devices for data distribution to a vehicle; a consent determination unit that is configured to judge a consent response from each of the plurality of devices; a distribution control unit that is configured to control the data distribution to the vehicle according to a determination result by the consent determination unit; and a necessity determination unit that is configured to determine whether the consent request to the plurality of devices is needed before the consent request are made to the plurality of devices. The consent request unit is further configured to determine whether to make the consent request to the plurality of devices according to a determination result by the necessity determination unit.

15 Claims, 15 Drawing Sheets

(51) Int. Cl.
   *B60W 50/14*   (2020.01)
   *G06F 21/62*   (2013.01)
   *H04L 9/40*    (2022.01)
   *H04L 67/562*  (2022.01)
   *H04W 12/30*   (2021.01)
   *H04W 12/55*   (2021.01)
   *H04W 48/20*   (2009.01)

(52) U.S. Cl.
   CPC ............... *G06F 2221/2103* (2013.01); *G06F 2221/2117* (2013.01)

(56) References Cited

U.S. PATENT DOCUMENTS

| | | | |
|---|---|---|---|
| 2016/0105415 | A1 | 4/2016 | Hiramoto et al. |
| 2016/0344747 | A1* | 11/2016 | Link, II ................... H04W 4/80 |
| 2018/0048473 | A1* | 2/2018 | Miller ....................... H04L 9/30 |
| 2018/0300472 | A1 | 10/2018 | Nakamura et al. |
| 2019/0155594 | A1 | 5/2019 | Nakaguma et al. |
| 2019/0187971 | A1* | 6/2019 | Wang ..................... H04W 12/06 |
| 2019/0379763 | A1* | 12/2019 | Wirtanen ................ H04W 4/14 |

FOREIGN PATENT DOCUMENTS

| | | | |
|---|---|---|---|
| JP | 2015228613 | A | 12/2015 |
| JP | 2016152438 | A | 8/2016 |
| JP | 2017224047 | A | 12/2017 |
| JP | 2019003509 | A | 1/2019 |
| WO | WO-2015132822 | A1 | 9/2015 |
| WO | WO-2017002611 | A1 | 1/2017 |

* cited by examiner

FIG. 2

| TARGET | PARAMETERS | | |
|---|---|---|---|
| | DATE/TIME | LOCATION INFO | |
| VEHICLE A | 9/8 22:00 | NORTH LATITUDE N11° N12' N13"<br>EAST LONGITUDE E11° E12' E13" | CITY A |
| VEHICLE A | 9/9 22:00 | NORTH LATITUDE N11° N12' N13"<br>EAST LONGITUDE E11° E12' E13" | CITY A |
| VEHICLE A | 9/10 22:00 | NORTH LATITUDE N11° N12' N13"<br>EAST LONGITUDE E11° E12' E13" | CITY A |
| VEHICLE A | 9/11 22:00 | NORTH LATITUDE N11° N12' N13"<br>EAST LONGITUDE E11° E12' E13" | CITY A |
| VEHICLE A | 9/12 22:00 | NORTH LATITUDE N21° N22' N23"<br>EAST LONGITUDE E21° E22' E23" | CITY B |
| VEHICLE A | 9/12 22:00 | NORTH LATITUDE N21° N22' N23"<br>EAST LONGITUDE E21° E22' E23" | CITY B |
| VEHICLE A | 9/13 22:00 | ... | ... |

↑ OWNER IS LIKELY TO BE CHANGED

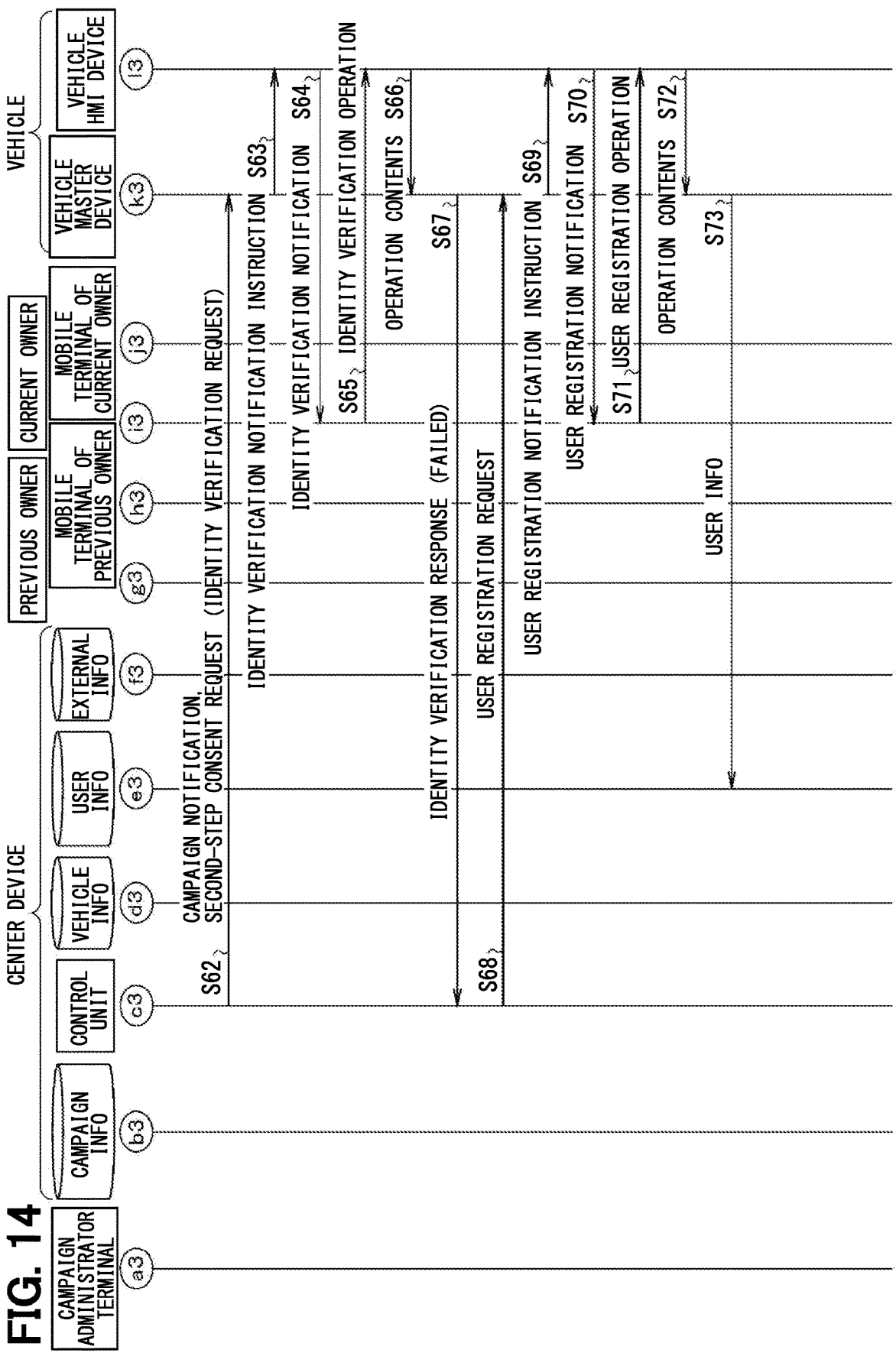

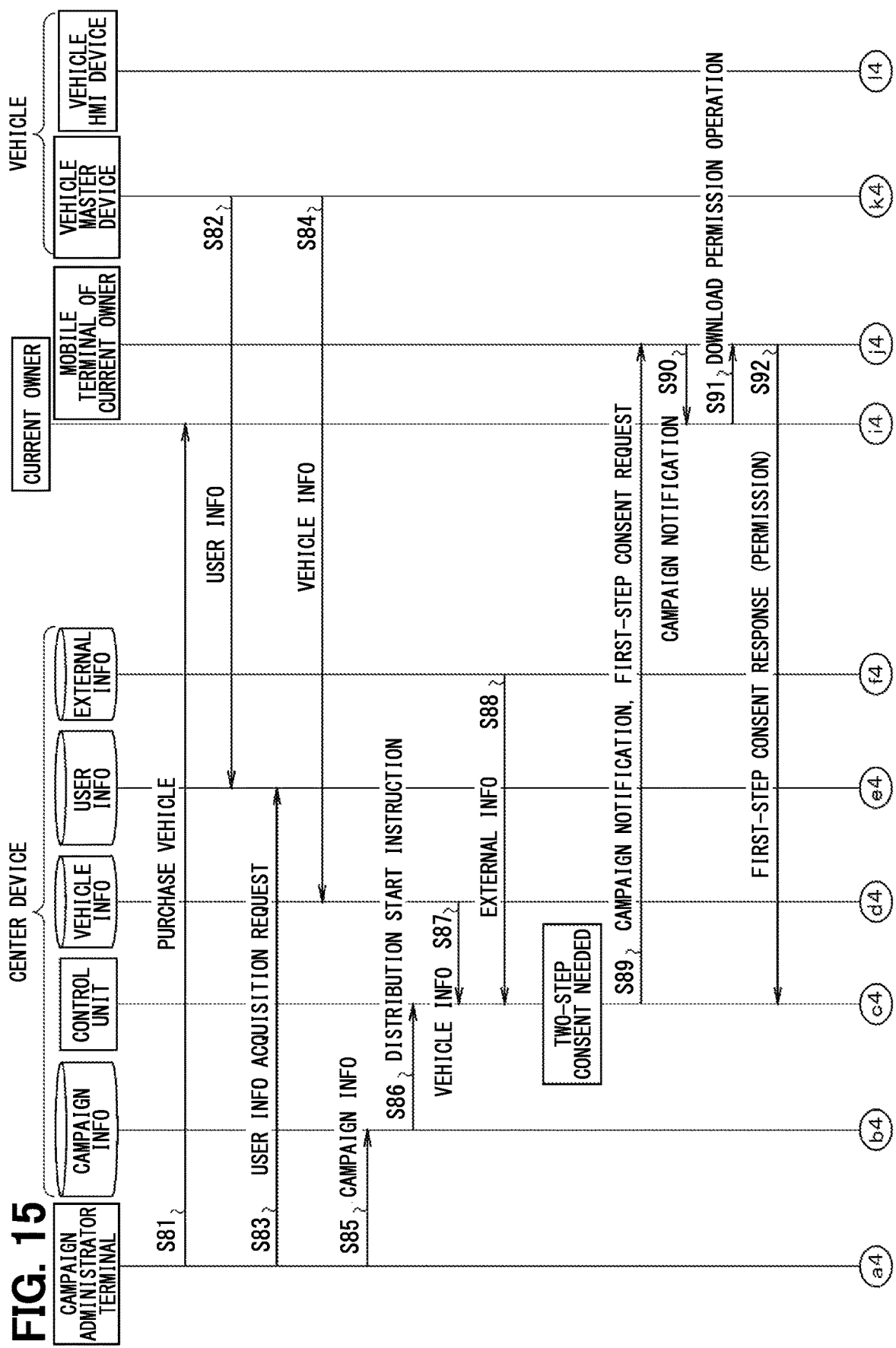

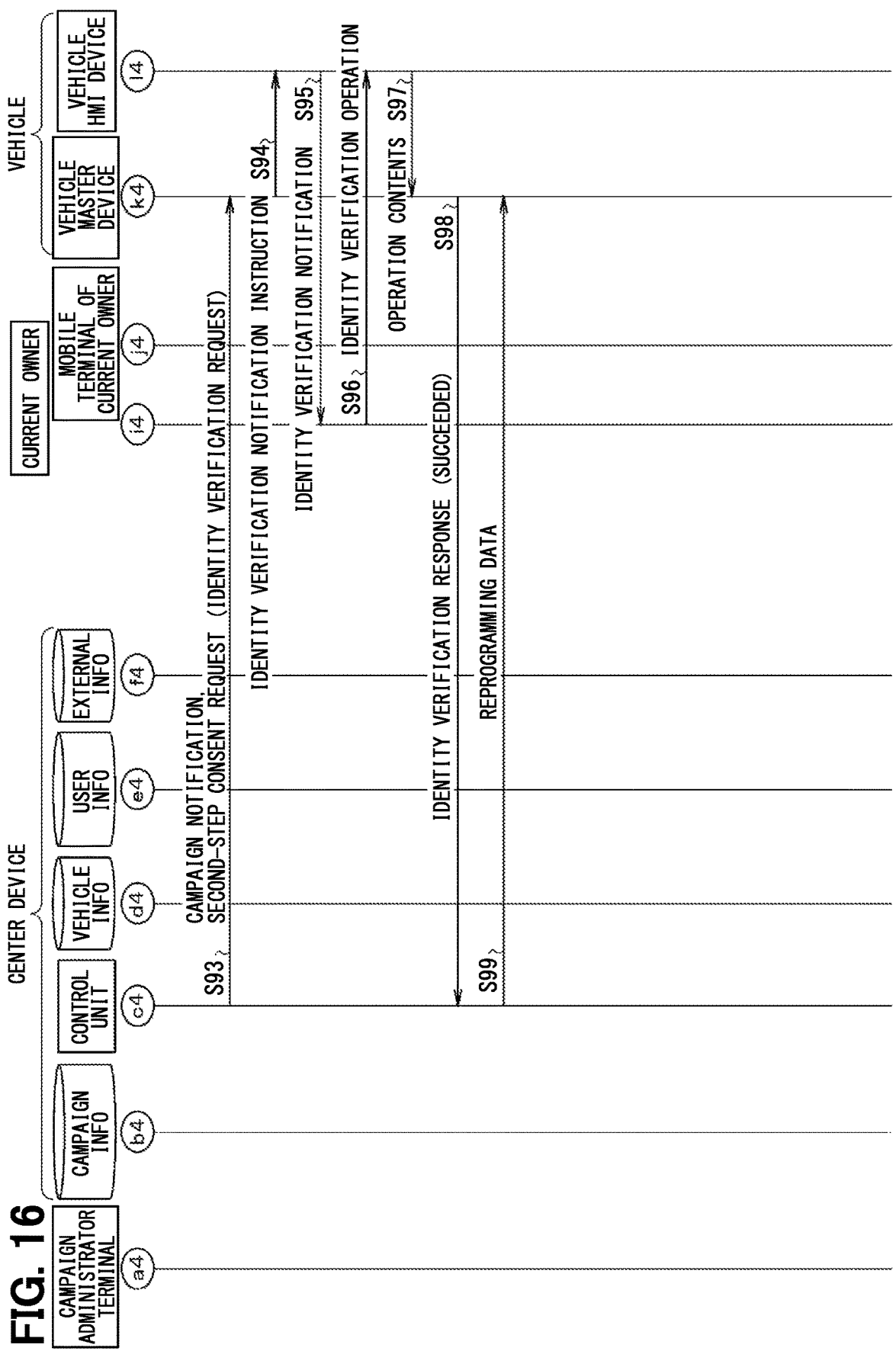

CENTER DEVICE ON A VEHICLE NETWORK, DATA DISTRIBUTION SYSTEM AND STORAGE MEDIUM STORING COMPUTER PROGRAM FOR DISTRIBUTION CONTROL FOR RE-PROGRAMMING ECUS

CROSS REFERENCE TO RELATED APPLICATIONS

This application is a continuation application of International Patent Application No. PCT/JP2020/002966 filed on Jan. 28, 2020 and based on and claims the benefits of priority of Japanese Patent Application No. 2019-030574 filed on Feb. 22, 2019. The entire disclosure of all of the above applications is incorporated herein by reference.

TECHNICAL FIELD

The present disclosure relates to a center device, a data distribution system, and a computer program product for distribution control.

BACKGROUND

In recent years, along with development of communication network technology, connected-cars related technology is developing as well. Taking advantage of the technology of connected cars, a system where a center device wirelessly distributes data to vehicles has been provided. For example, a patent literature 1 discloses a system where a center device wirelessly distributes reprogramming data to vehicles to update an application program of an in-vehicle electronic control unit (hereinafter, referred to as ECU (Electronic Control Unit)).

SUMMARY

According to one aspect of the present disclosure, a consent request unit is configured to make a consent request to a plurality of devices for data distribution to a vehicle. A consent determination unit is configured to judge a consent response from each of the plurality of devices. A distribution control unit that is configured to control the data distribution to the vehicle according to a determination result by the consent determination unit.

BRIEF DESCRIPTION OF THE DRAWINGS

The above and other objects, features and advantages of the present disclosure will become more apparent from the following detailed description made with reference to the accompanying drawings. In the drawings:

FIG. 2 is a diagram showing changes in position information;

FIG. 14 is a diagram (No. 4) showing a flow of the process of the two-step consent;

FIG. 15 is a diagram (No. 5) showing a flow of the process of the two-step consent; and FIG. 16 is a diagram (No. 6) showing a flow of the process of the two-step consent.

DETAILED DESCRIPTION

Figure 1:
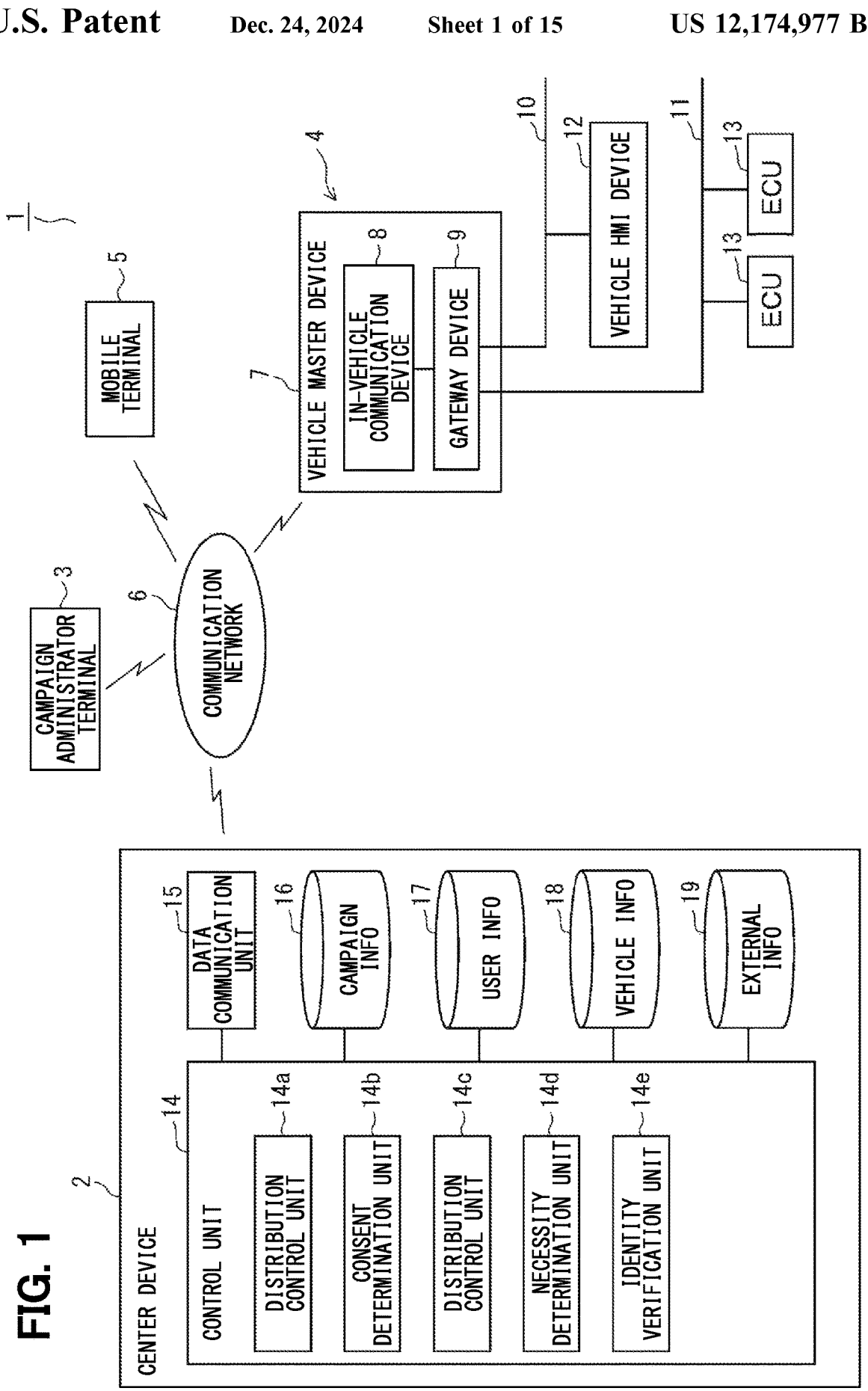
FIG. 1 is a diagram showing a configuration according to an embodiment of the present disclosure.

Next, to understand the following embodiments, the related techniques of the present disclosure will be described below.

Convenience of users can be improved if an update for an application program can be controlled through a vehicle HMI as an HMI (Human Machine Interface) such as a navigation device mounted in a vehicle, but also if it can be controlled through a mobile terminal that can be carried by a user such as a smartphone. However, there are the following concerns in a configuration where an application update are controlled through a plurality of devices such as a vehicle HMI device and a mobile terminal.

For example, when a vehicle is bought or sold or transferred, the owner who owns the vehicle is changed, but a center device that is configured to distribute reprogramming data may not manage the information that the owner was changed. If a reprogramming data distribution event is established while the center device does not manage the information that the owner was changed, a campaign notification notifying that the reprogramming data is to be distributed is not transmitted from the center device to the mobile terminal of the current owner of the vehicle but to the mobile terminal of the previous owner of the vehicle. In this case, if the previous owner permits the distribution of the reprogramming data, the distribution of the reprogramming data would start even though the current owner of the vehicle does not permit the distribution of the reprogramming data, and an application program for an ECU would be updated.

One objective of the present disclosure is to appropriately distribute data to a vehicle.

As described above, according to the one aspect of the present disclosure, a consent request unit is configured to make a consent request to a plurality of devices for data distribution to a vehicle. A consent determination unit is configured to judge a consent response from each of the plurality of devices. A distribution control unit that is configured to control the data distribution to the vehicle according to a determination result by the consent determination unit.

The consent request are made to the plurality of devices and the data distribution to the vehicle is controlled according to the determination result of the consent response from each of the plurality of devices. By including, in the plurality of devices, a device through which a current owner of the vehicle makes the consent response, even if the owner of the vehicle is changed, the consent request is made to the previous owner, and the previous owner permits the data distribution, it is possible to avoid a situation where the data distribution is started only with the permission by the previous owner.

Accordingly, it is possible to avoid a situation where distribution of data is started even though the current owner of the vehicle does not permit the distribution of the data, and thus it is possible to appropriately distribute the data from the center device to a vehicle.

According to another aspect of the present disclosure, a center device is configured to: make a consent request to a plurality of devices for data distribution to a vehicle; judge a consent response from each of the plurality of devices; and control the data distribution to the vehicle according to a determination result of the consent request. Each of the plurality of devices is configured to make the consent response in response to the consent request from the center device.

A device through which the current owner of the vehicle makes a permission response is included in multiple devices that are consent request targets. Thus, even if the owner of the vehicle is changed and a consent request is made to a device of the previous owner, and the previous owner permits data distribution, it is possible to avoid a situation where the data distribution is started based only on the permission by the previous owner.

Hereinafter, one embodiment of the present disclosure will be described with reference to the drawings. A data distribution system is a system where a center device wirelessly distributes data to vehicles. In the present embodiment, as data distributed from the center device to vehicles, for example, reprograming data for updating an application program for an in-vehicle ECU that is used for vehicle control or vehicle diagnosis, for example. The reprograming data includes software necessary for hardware (a physical machine) of the ECU to control the operation of the ECU by executing the application program.

As shown in FIG. 1, the data distribution system 1 includes a center device 2 that distributes reprograming data to vehicles, a campaign administrator terminal 3 administered by a campaign administrator that provides the reprograming data to the center device 2, a vehicle-side system 4 mounted in the vehicle, and a mobile terminal 5 (a first device) carried by a user. The mobile terminal 5 may be a smartphone or a tablet having a web browser. The center device 2, the campaign administrator terminal 3, the vehicle-side system 4, and the mobile terminal 5 are configured to communicate with each other via a communication network 6. The communication network 6 may include a communication network compliant with LPWA (Low Power Wide Area) communication method and a communication network compliant with LTE (Long Term Evolution) communication method. The center device 2 forms a one-to-many relationship with the vehicle-side systems 4 and the mobile terminals 5. That is, the center device 2 is configured to communicate with, and distribute reprograming data to, an unspecified number of vehicle-side systems 4 and an unspecified number of mobile terminals 5.

The campaign administrator terminal 3 administrates the reprograming data distributed from the center device 2 to the vehicles. The campaign administrator terminal 3 transmits campaign information to the center device 2 when a reprograming data distribution event is established such as an event to improve functions or to repair bug.

When the center device 2 receives the campaign information from the campaign administrator terminal 3, the center device 2 transmits a campaign notification to the vehicle-side system 4 and the mobile terminal 5. The campaign notification is a notification that notifies the vehicle-side system 4 and the mobile terminal 5 of distribution of reprograming data.

The vehicle-side system 4 has a vehicle master device 7. The vehicle master device 7 has an in-vehicle communication device 8 and a gateway device 9, and the in-vehicle communication device 8 and the gateway device 9 are connected to communicate data with each other. The in-vehicle communication device 8 performs data communication with the center device 2 via the communication network 6. When the in-vehicle communication device 8 downloads reprogramming data from the center device 2, the in-vehicle communication device 8 transfers the downloaded reprogramming data to the gateway device 9.

A vehicle HMI device 12 (a second device) is connected to the gateway device 9 via a bus 10, and various types of ECUs 13 are connected to the gateway device 9 via a bus 11. The vehicle HMI device 12 has an HMI function and also has a function of displaying various screen images and a function of accepting user operations. The bus 11 is, for example, a body network bus, a traveling network bus, a multimedia network bus, or the like. An ECU that controls a body system is connected to the body network bus, and for example, a door ECU that controls lock/unlock of doors is connected to the bus. An ECU that controls a travelling system is connected to the traveling network bus, and for example, an engine ECU that controls operation of the engine is connected to the bus. An ECU that controls a multimedia system is connected to the multimedia network bus, and for example, a navigation ECU for controlling the navigation system is connected to the bus. The type and number of buses 11 and the type and number of ECUs 13 are not necessarily limited to the above-described configuration.

The gateway device 9 has a data relay function, and when reprogramming data is transferred from the in-vehicle communication device 8, the transferred reprogramming data is distributed to the ECU 13 that is designated as a distribution target. When the ECU 13 receives the reprogramming data from the gateway device 9, the ECU 13 writes the received reprogramming data to a flash memory. By writing the reprogramming data to the flash memory, the ECU 13 updates an application program to improve the function of the application program and fixe a bug.

In the above-described configuration, when the mobile terminal 5 and the vehicle HMI device 12 receive the campaign notification from the center device 2, a campaign notification screen image is displayed to notify the user of campaign information that notifies the user that the reprogramming data can be downloaded from the center device 2. When the campaign notification screen image is displayed on the mobile terminal 5 or the vehicle HMI device 12, the user confirms the procedure for updating the application program through various screens, and can start updating the application program by inputting or selecting necessary items. That is, the user can update the application program by properly using the mobile terminal 5 at an outside of the vehicle or the vehicle HMI device 12 at an inside of the vehicle. That is, the user can update the application program through the vehicle HMI device 12 in the vehicle. On the contrary, if the user is not riding in the vehicle but holds a mobile terminal 5, the user can update the application program through the mobile terminal 5. If an urgent update for the application program is required, reprogramming data may be downloaded from the center device 2 without displaying the campaign notification screen image and without the user taking the procedure for updating the application program.

The center device 2 includes a control unit 14, a data communication unit 15, a campaign information storage unit 16, a user information storage unit 17, a vehicle information storage unit 18, and an external information storage unit 19. In the present embodiment, these storage units 16 to 19 are illustrated as provided in the center device 2. However, these storage units 16 to 19 may be provided in an external server that is different from the center device 2 and the center device 2 and the external server may communicate data with each other.

The data communication unit 15 performs data communication with the campaign administrator terminal 3, the vehicle side system 4, and the mobile terminal 5 via the communication network 6.

The campaign information storage unit 16 stores, as campaign information, various information related to reprogramming data for a distribution target. The campaign information includes a distribution target, a distribution data amount, a type of reprogramming data, and the like, and is stored in the campaign information storage unit 16 after transmitted from the campaign administrator terminal 3 to the center device 2.

The user information storage unit 17 stores, as user information, various information about an owner who owns the vehicle. The user information includes a vehicle identification number (hereinafter referred to as VIN (Vehicle Identification Number)) uniquely assigned to the vehicle, a telephone number of the in-vehicle communication device 8 mounted in the vehicle, and a telephone number of the mobile terminal 5 owned by the user. The user information is stored in the user information storage unit 17 when, for example, the user performs an input operation through the vehicle HMI device 12 at the time of, for example, purchasing the vehicle, and the input user information is transmitted from the vehicle master device 7 to the center device 2. When a vehicle is bought/sold or transferred, the ownership of the vehicle is changed, and therefore it is necessary to change user information in accordance with the change of the ownership.

The vehicle information storage unit 18 stores various information about the vehicle as vehicle information. The vehicle information includes log information indicating a vehicle log and position information indicating a vehicle position. The vehicle log is, for example, a time of turning on the engine, a time of turning off the engine, an accelerator operation time and its operation amount, a brake operation time and its operation amount, a steering operation time and its operation amount, and the like. The vehicle information is stored in the vehicle information storage unit 18 when transmitted from the vehicle master device 7 to the center device 2.

The external information storage unit 19 stores various information acquired from an outside of the vehicle as external information. The external information includes, for example, map information and the external information is stored in the external information storage unit 19 when transmitted to the center device 2 from a map information distribution server that is configured to distribute the map information.

The control unit 14 includes a microcomputer having a CPU (central processing unit), a ROM (read only memory), a RAM (random access memory), and the like. The controller executes a control program stored in a non-transitory tangible storage medium to perform various processes and controls the operation of the center device 2. The control programs executed by the control unit 14 include a distribution control program. The control unit 14 includes a consent request unit 14a, a consent determination unit 14b, a distribution control unit 14c, a necessity determination unit 14d, and an identity verification unit 14e.

The consent request unit 14a makes a consent request regarding distribution of reprogramming data to the mobile terminal 5 and the vehicle HMI device 12 by transmitting the campaign notification and the consent request from the data communication unit 15 to the mobile terminal 5 and the vehicle HMI device 12. The way in which the consent request unit 14a makes the consent request includes a one-step consent in which the consent request is made only to the mobile terminal 5 and a two-step consent in which the consent request is made to both the mobile terminal 5 and the vehicle HMI device 12.

When a consent response transmitted from the mobile terminal 5 or the vehicle HMI device 12 is received by the data communication unit 15, the consent determination unit 14b judges the consent response from the mobile terminal 5 or the vehicle HMI device 12. When the owner makes an operation to permit the consent via the mobile terminal 5 or the vehicle HMI device 12 and as a result, the consent response transmitted from the mobile terminal 5 or the vehicle HMI device 12 indicates a permission, the consent determination unit 14b determines that the consent response is a permission. On the contrary, when the owner makes an operation to refuse the consent or the owner does not make any operation via the mobile terminal 5 or the vehicle HMI device 12 and as a result, the consent response transmitted from the mobile terminal 5 or the vehicle HMI device 12 indicates a rejection, the consent determination unit 14b determines that the consent response is a rejection.

The distribution control unit 14c controls distribution of the reprogramming data to vehicles. The necessity determination unit 14d monitors, a change in a vehicle state, for example, and determines whether a consent request is needed to both the mobile terminal 5 and the vehicle HMI device 12, i.e., determines whether the two-step consent is needed. Then, the necessity determination unit 14d decides which of the one-step consent or the two-step consent is to be made.

The necessity determination unit 14d monitors, as a change in the vehicle state, a change in a parking position, a change in a traveling route, and a change in a driving operation, and decides which of the one-step consent and the two-step consent is to be made. The necessity determination unit 14d periodically monitors, for example, the vehicle position included in the position information at a particular time every day, and if the unit 14d determines that the vehicle position has not changed, the unit 14d determines that the two-step consent is not necessary. However, if the unit 14d determines that the vehicle position has changed, the unit 14d determines that the two-step consent is necessary. As shown in FIG. 2, when the necessity determination unit 14d determines that the vehicle position is changed at a particular time (10:00 pm in FIG. 2) on a particular day (September 11 to 12 in FIG. 2), the unit 14d determines that the owner is likely to be changed (the owner is changed from a person living in City A to a person living a City B in FIG. 2) and therefore the unit 14d determines that the two-step consent is needed.

Similarly, the necessity determination unit 14d periodically monitors the travel route in, for example, a particular time zone every day, and if the unit 14d determines that the travelling route is changed on a particular day, the unit 14d may determine that the owner is likely to be changed. In addition, the necessity determination unit 14*d* periodically monitors the driving operation (for example, an acceleration/deceleration operation based on a frequency and an amount of acceleration operation and braking operation, a sharp turning operation based on a frequency and an amount of steering operation), and if the unit 14*d* determines that the driving operation is changed on a specific date, the unit 14*d* determines that the owner is likely to be changed. That is, when an owner is changed due to the sale or transfer of a vehicle, the necessity determination unit 14*d* determines that the owner is likely to be changed by recognizing that the vehicle position or the traveling route is changed due to the change in the living location of the new owner or that the driving operation is changed because of the new owner's driving preference.

When the necessity determination unit 14*d* determines that the two-step consent is not needed, the consent request unit 14*a* as described above performs the one-step consent and makes the consent request only to the mobile terminal 5. When the necessity determination unit 14*d* determines that the two-step consent is needed, the consent request unit 14*a* performs the two-step consent, makes a first-step consent request to the mobile terminal 5, and makes an identity verification request as a second-step consent request to the vehicle HMI device 12.

When an identity verification response transmitted from the vehicle HMI device 12 is received by the data communication unit 15, the identity verification unit 14*e* judges the identity verification response from the vehicle HMI device 12. When the owner performs an operation by inputting, for example, a correct security code, which will be described later, via the vehicle HMI device 12 and thus it is indicated that the identity verification response transmitted from the vehicle HMI device 12 is true, the identity verification unit 14*e* determines that the identity verification response is true. On the contrary, when the owner does not perform an operation to input the correct security code via the vehicle HMI device 12 and thus it is indicated that the identity verification response transmitted from the vehicle HMI device 12 is false, the identity verification unit 14*e* determines that the identity verification response is false.

Next, the one-step consent and the two-step consent will be described with reference to FIGS. 3 to 8.

(1-1) One-Step Consent

Figure 3:
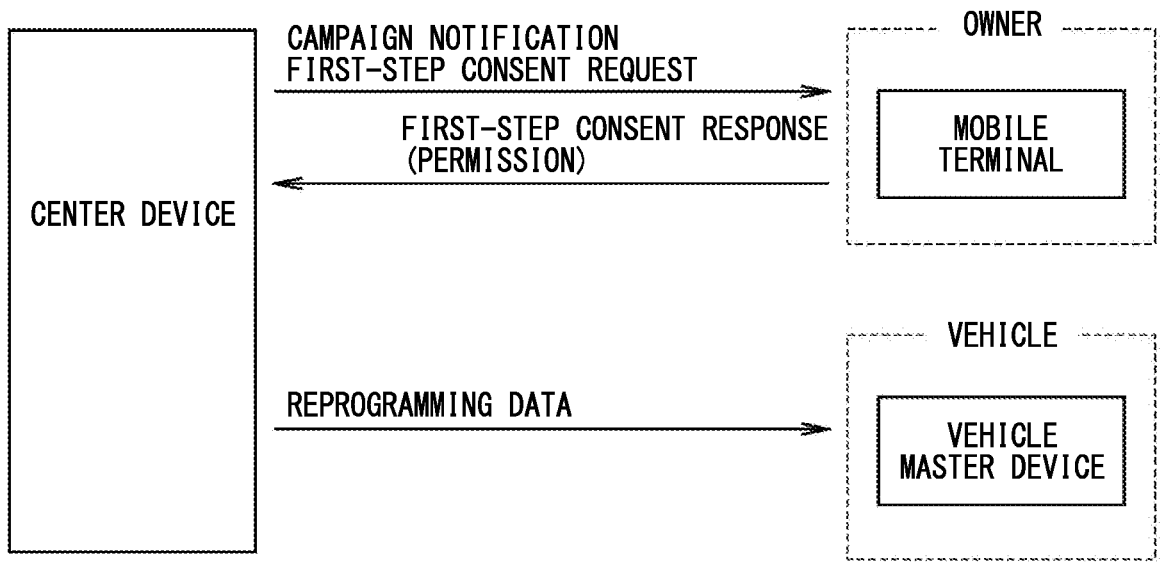
FIG. 3 is a diagram showing a procedure of a one-step consent.
Figure 4:
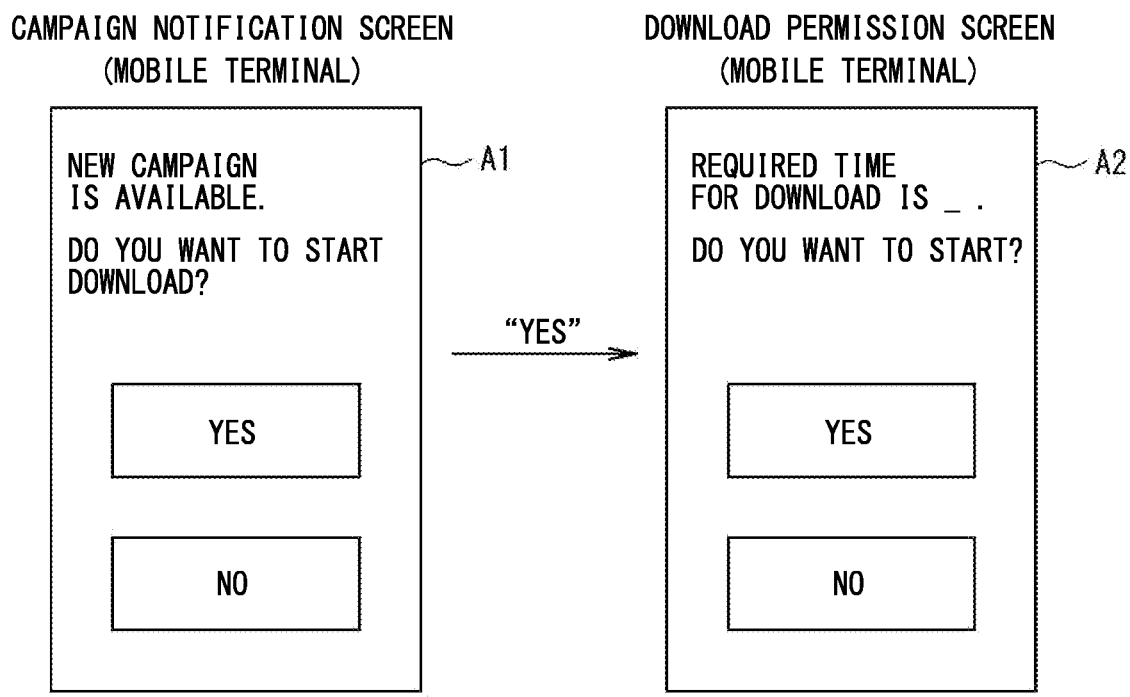
FIG. 4 is a diagram showing a transition of a screen in a mobile terminal.

As shown in FIGS. 3 and 4, in the one-step consent, the center device 2 transmits a campaign notification and the first-step consent request to the mobile terminal 5 when the distribution event of reprogramming data is established.

When the mobile terminal 5 receives the campaign notification and the first-step consent request from the center device 2, the mobile terminal 5 displays a campaign notification screen A1 and notifies the owner of the campaign information. When the owner selects "Yes" on the campaign notification screen A1, the mobile terminal 5 displays a download permission screen A2 and prompts the owner to select whether to allow the reprogramming data to be downloaded. When the owner selects "Yes" on the download permission screen A2, the mobile terminal 5 transmits the first-step consent response as a permission to the center device 2.

The center device 2 receives the first-step consent response transmitted from the mobile terminal 5, and when the device 2 determines that the received first-step consent response indicates a permission, the center device 2 starts distributing the reprogramming data to the vehicle master device 7. That is, at the one-step consent process, the owner can start distributing the reprogramming data simply by operating the mobile terminal 5.

(1-2) Two-Step Consent

Figure 5:
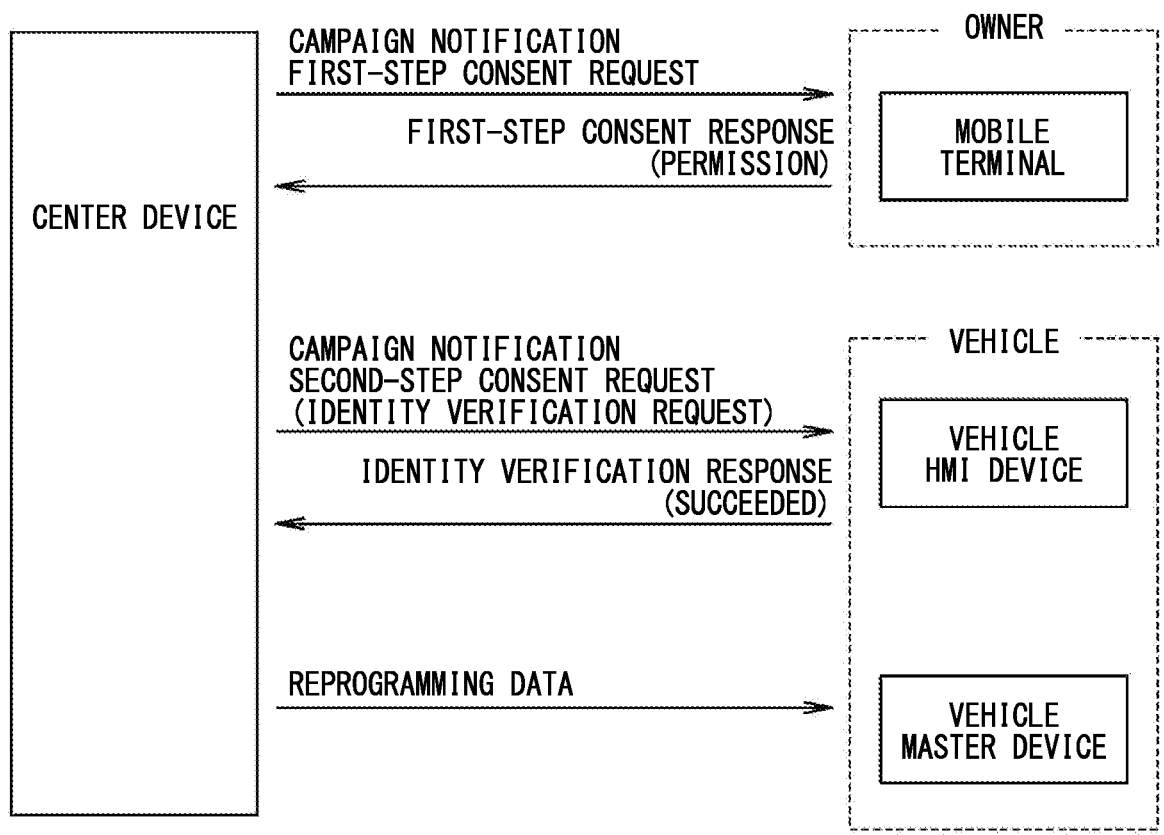
FIG. 5 is a diagram (No. 1) showing a procedure of a two-step consent.
Figure 6:
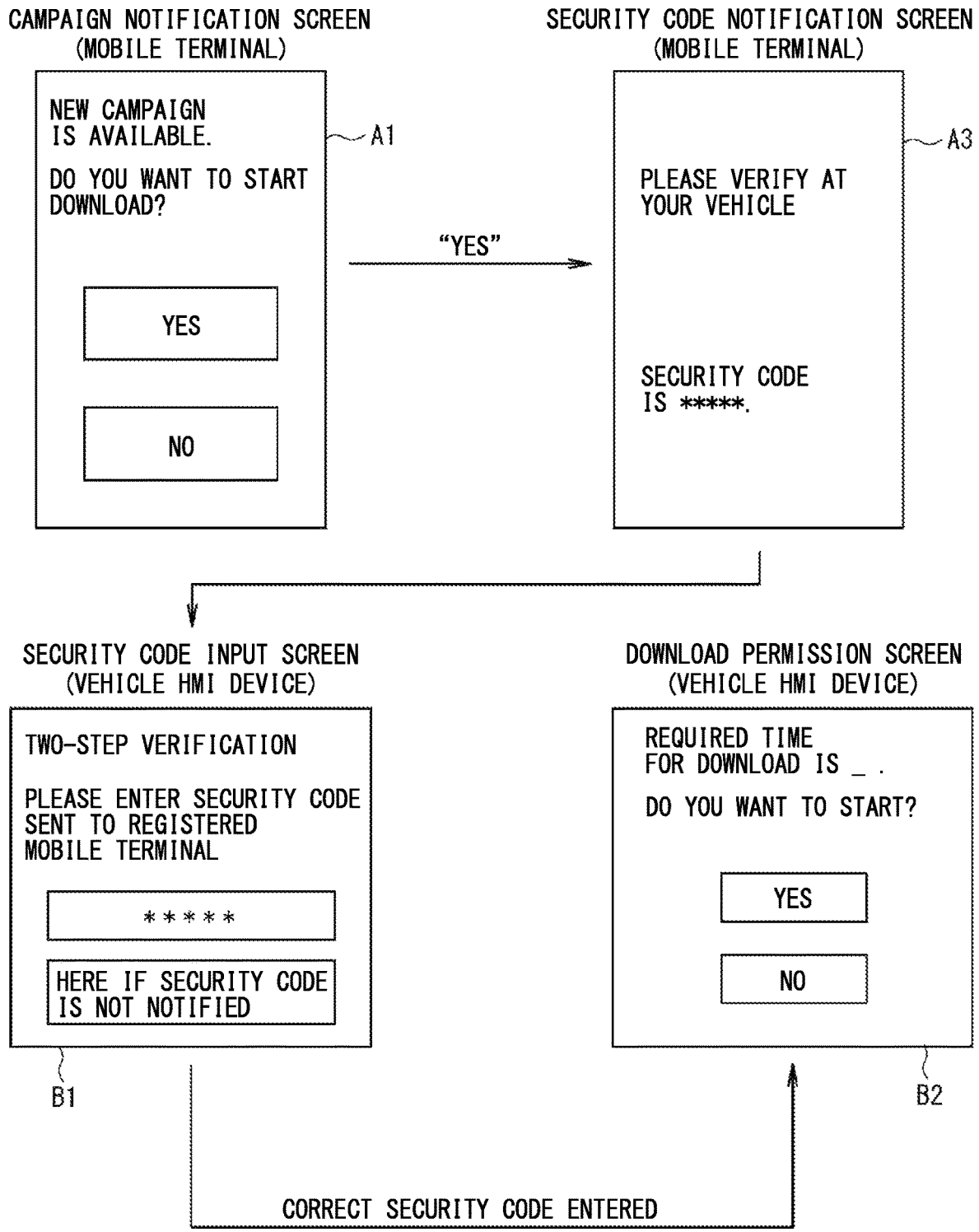
FIG. 6 is a diagram (No. 1) showing a transition of screens in the mobile terminal and a vehicle HMI device.

As shown in FIGS. 5 and 6, in the two-step consent, the center device 2 first transmits a campaign notification and a first-step consent request to the mobile terminal 5 when the distribution event of reprogramming data is established.

When the mobile terminal 5 receives the campaign notification and the first-step consent request from the center device 2, the mobile terminal 5 displays the campaign notification screen A1 and notifies the owner of the campaign information. When the owner selects "Yes" on the campaign notification screen A1, the mobile terminal 5 displays a security code notification screen A3, notifies the owner of a security code, and transmits the first-step consent response as a permission to the center device 2.

The center device 2 receives the first-step consent response transmitted from the mobile terminal 5, and when the device 2 determines that the received first-step consent response indicates a permission, the center device 2 next transmits the campaign notification and the second-step consent request (the identity verification request) to the vehicle HMI device 12.

Upon receiving the campaign notification and the second-step consent request (the identity verification request) transmitted from the center device 2, the vehicle HMI device 12 displays a security code input screen B1 and prompts the owner to input the security code. When the owner inputs the correct security code, the vehicle HMI device 12 displays a download permission screen B2 and prompts the owner to select whether to permit the reprogramming data to be downloaded. When the owner selects "Yes" on the download permission screen B2, the vehicle HMI device 12 transmits the identity verification response to the center device 2 as a truth.

The center device 2 receives the identity verification response transmitted from the vehicle HMI device 12, and if the device 2 determines that the received identity verification response is true, the center device 2 starts distributing the reprogramming data to the vehicle master device 7. That is, in the two-step consent, the owner cannot start distributing the reprogramming data only by operating the mobile terminal 5, but can start distributing the reprogramming data by operating the vehicle HMI device 12 after operating the mobile terminal 5.

Figure 7:
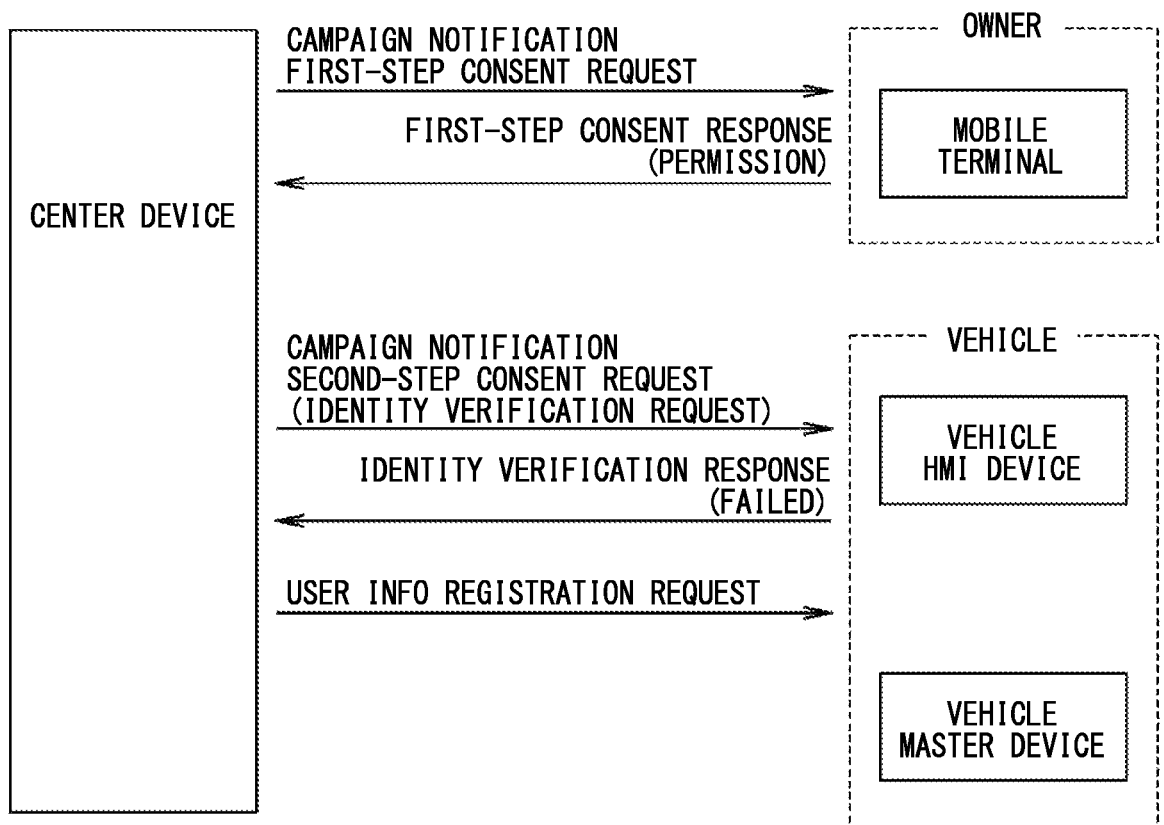
FIG. 7 is a diagram (No. 2) showing a procedure of the two-step consent.
Figure 8:
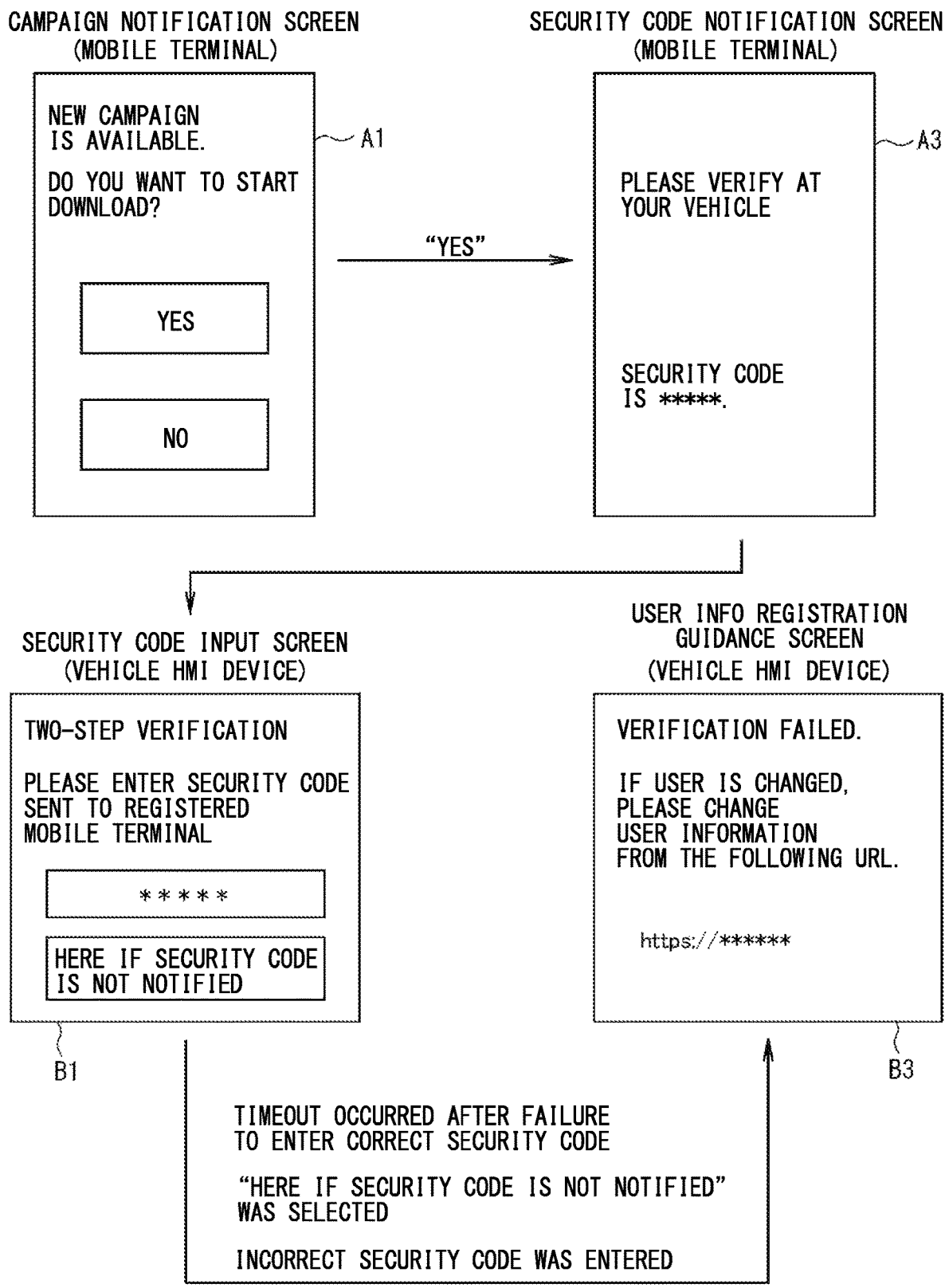
FIG. 8 is a diagram (No. 2) showing a transition of the screens in the mobile terminal and the vehicle HMI device.

On the contrary, as shown in FIGS. 7 and 8, the vehicle HMI device 12 transmits the identity verification response to the center device 2 as a failure if the owner does not input the correct security code.

The center device 2 receives the identity verification response transmitted from the mobile terminal 5, and if the device 2 determines that the received identity verification response is false, the device 2 transmits a user registration request to the vehicle HMI device 12. Upon receiving the user registration request from the center device 2, the vehicle HMI device 12 displays a user registration guidance screen B3 and prompts the owner to register user information.

Next, the process of the above configuration will be described with reference to FIGS. 9 to 16. Here, the following scenarios will be described in this order.

(2-1) When the Owner of the Vehicle has not Changed
(2-2) When the Owner of the Vehicle has Changed and the Previous Owner Permits Distribution of Reprogramming Data
(2-3) When the Owner of the Vehicle has Changed and the Previous Owner Rejects Distribution of Reprogramming Data.

(2-4) When the Owner of the Vehicle has not Changed.

Figure 9:
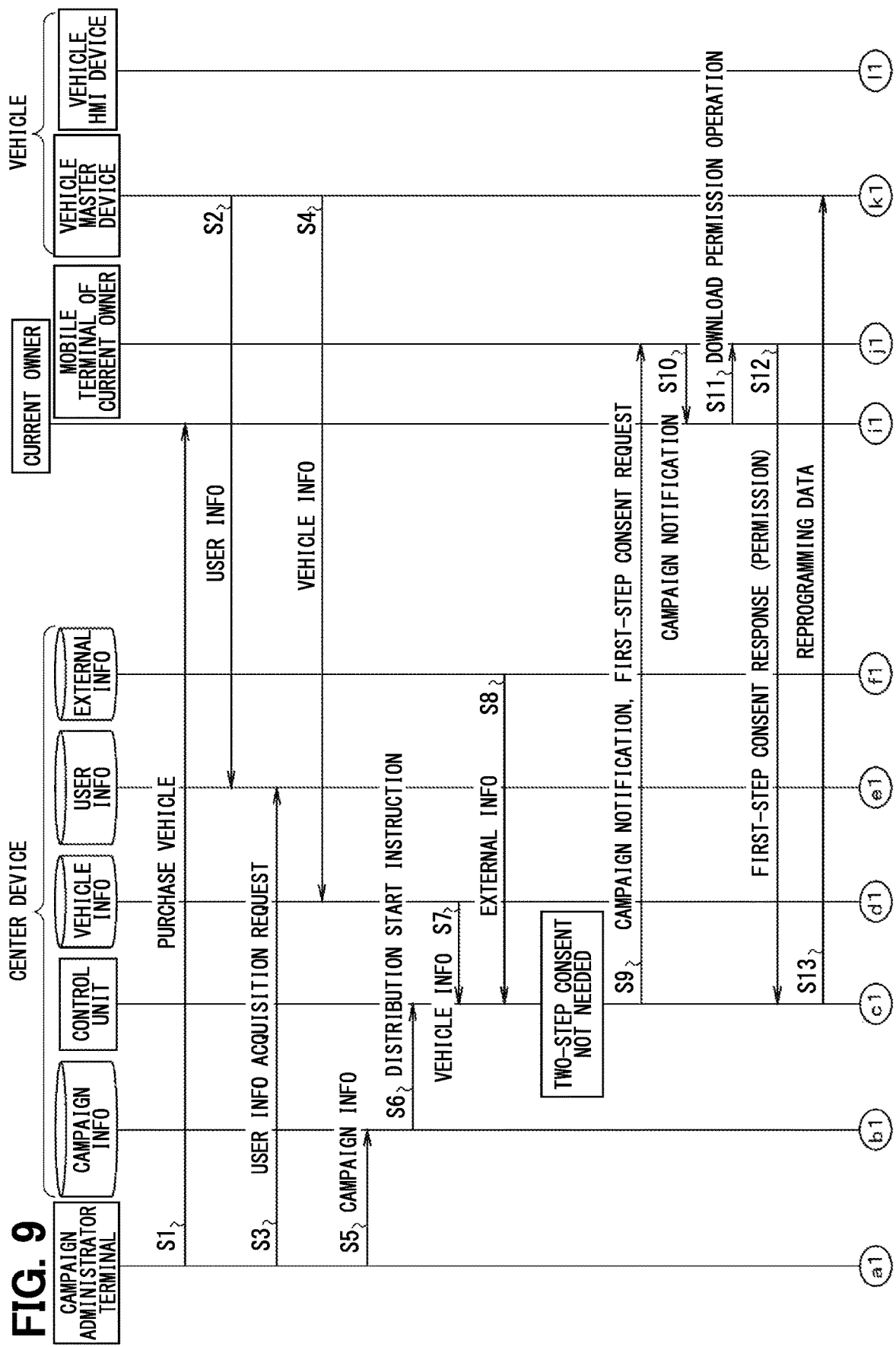
FIG. 9 is a diagram (No. 1) showing a flow of a process of the one-step consent.
Figure 10:
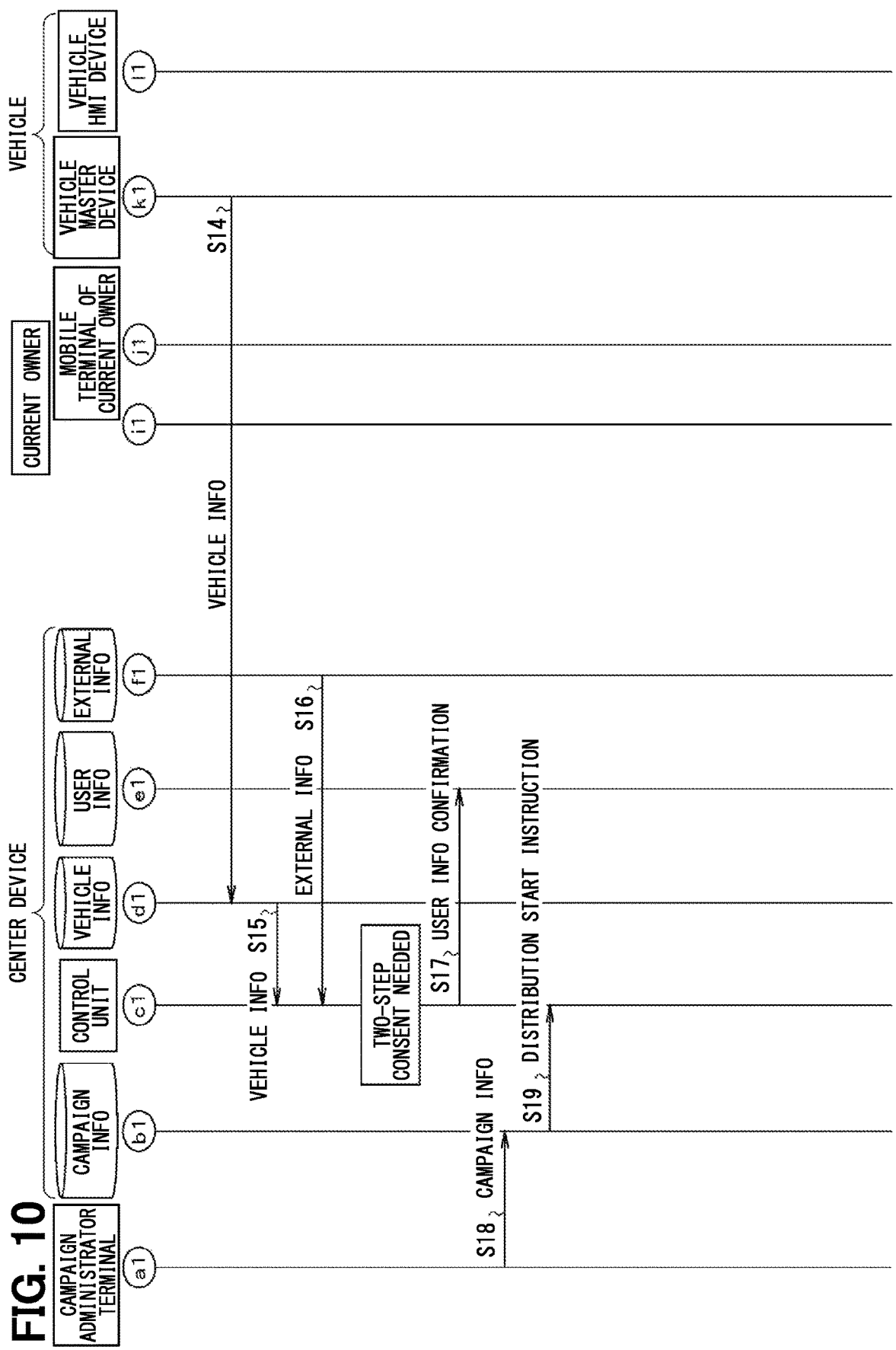
FIG. 10 is a diagram (No. 2) showing a flow of the process of the one-step consent.

As shown in FIGS. 9 and 10, when a user purchases a vehicle, the user who purchased the vehicle becomes a current owner (S1). For example, when the current owner performs a user information registration operation using the vehicle HMI device 12 or the like, the vehicle master device 7 transmits the user information registered by the current owner to the center device 2 (S2). At the center device 2, when the user information transmitted from the vehicle master device 7 is received, the user information storage unit 17 stores the received user information. The current owner may perform the user information registration operation via the mobile terminal 5 owned by the current owner.

The campaign administrator terminal 3 transmits a user information acquisition request to the center device 2, and receives and acquires the user information transmitted from the center device 2 (S3). After transmitting the user information to the center device 2, the vehicle master device 7 periodically transmits the vehicle information to the center device 2 (S4). At the center device 2, when the vehicle information transmitted from the vehicle master device 7 is received, the control unit 14 stores the received vehicle information in the vehicle information storage unit 18.

When the distribution event for the reprogramming data is established, the campaign administrator terminal 3 transmits the campaign information to the center device 2 (S5). At the center device 2, when the control unit 14 receives the campaign information transmitted from the campaign administrator terminal 3, the control unit 14 stores the received campaign information in the campaign information storage unit 16. When the control unit 14 determines a distribution start instruction (S6), the control unit 14 acquires the vehicle information stored in the vehicle information storage unit 18 (S7), acquires the external information stored in the external information storage unit 19 (S6). S8), and determines whether the two-step consent is needed based on the acquired vehicle information and the acquired external information.

The control unit 14 determines whether there is a change in the vehicle state, for example. Then, if the control unit 14 determines that there is no change in at least one of the parking position, the traveling route, and the driving operation so that there is no change in the vehicle state, the control unit 14 determines that the two-step consent is not needed. On the contrary, if the control unit 14 determines that there is a change in at least one of the parking position, the traveling route, and the driving operation so that there is a change in the vehicle state, the control unit 14 determines that the two-step consent is needed. In this case, since the owner of the vehicle has not been changed, the control unit 14 determines that the vehicle state has not changed, and thus determines that the two-step consent is not needed. The control unit 14 transmits the campaign notification and the first-step consent request to the mobile terminal 5 of the current owner (S9, a consent request step).

When the mobile terminal 5 of the current owner receives the campaign notification and the first-step consent request from the center device 2, the mobile terminal 5 notifies the current owner of the campaign information (S10) and prompts the current owner to permit whether to start downloading the reprogramming data. When the current owner selects to allow the reprogramming data to be downloaded (S11), the mobile terminal 5 of the current owner transmits the first-step consent response as a permission to the center device 2 (S12). At the center device 2, when the control unit 14 receives the first-step consent response from the mobile terminal 5 of the current owner and determines that the received one-step consent response indicates a permission (a permission determination step), the control unit 14 distributes the reprogramming data to the vehicle master device 7 (S13) since the two-step consent is determined not to be needed in this case.

After downloading the reprogramming data from the center device 2, the vehicle master device 7 periodically transmits the vehicle information to the center device 2 (S14). At the center device 2, when the vehicle information transmitted from the vehicle master device 7 is received, the control unit 14 stores the received vehicle information in the vehicle information storage unit 18.

The control unit 14 acquires the vehicle information stored in the vehicle information storage unit 18 (S15), acquires the external information stored in the external information storage unit 19 (S16), and periodically determines whether the two-step consent is needed based on the acquired vehicle information and the acquired external information. Thereafter, if the control unit 14 determines that there is a change in at least one of the parking position, the traveling route, and the driving operation so that there is a change in the vehicle state, the control unit 14 confirms the user information stored in the user information storage unit 17 (S17).

When the distribution event for the reprogramming data is established, the campaign administrator terminal 3 transmits the campaign information to the center device 2 (S18). At the center device 2, when the control unit 14 receives the campaign information transmitted from the campaign administrator terminal 3, the control unit 14 stores the received campaign information in the campaign information storage unit 16. When the control unit 14 determines the distribution start instruction (S19), the control unit 14 performs the two-step consent since the two-step consent is determined to be needed at this point.

(2-2) When the Owner of the Vehicle has Changed and the Previous Owner Permits Distribution of Reprogramming Data.

Figure 11:
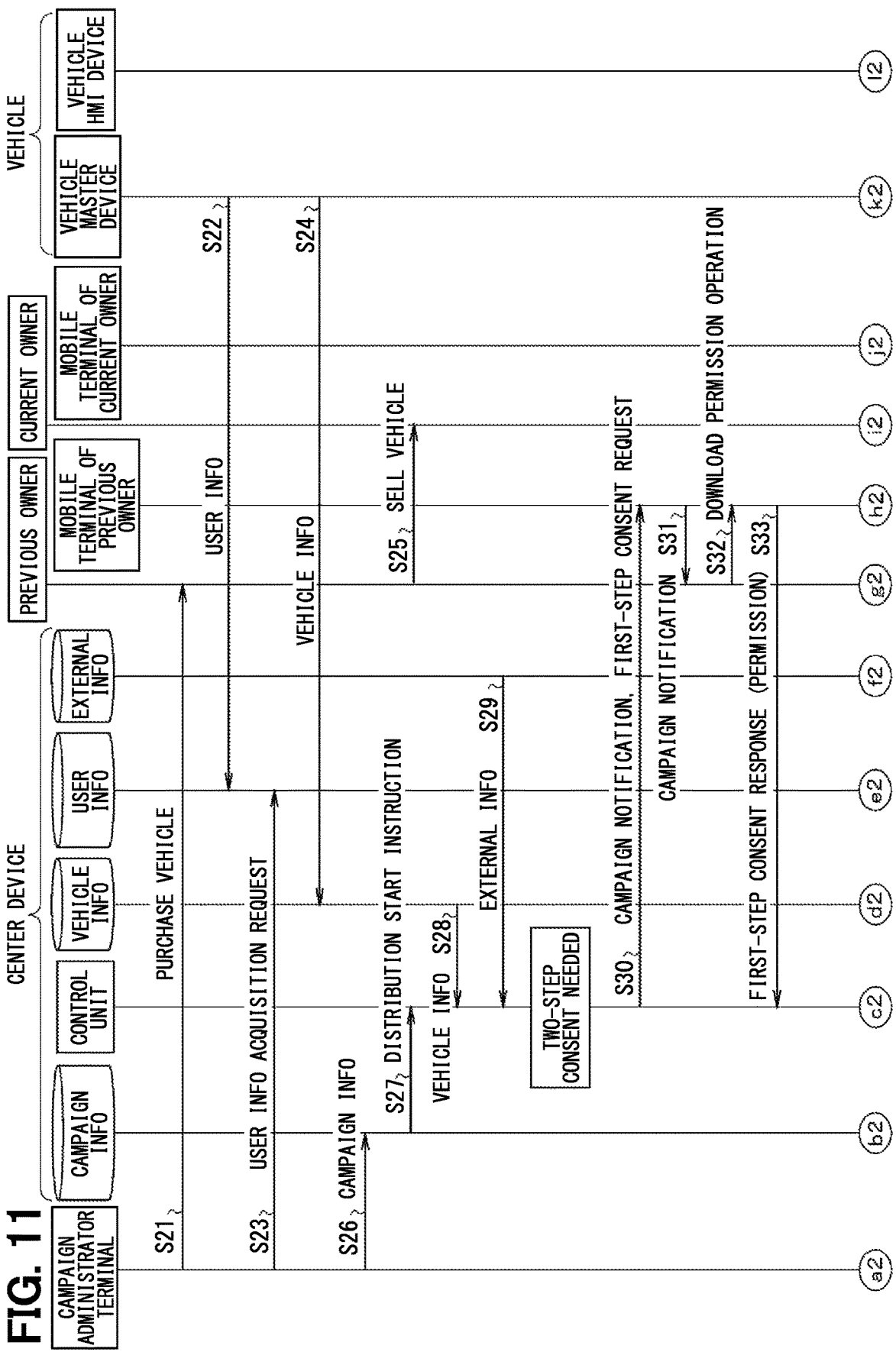
FIG. 11 is a diagram (No. 1) showing a flow of a process of the two-step consent.
Figure 12:
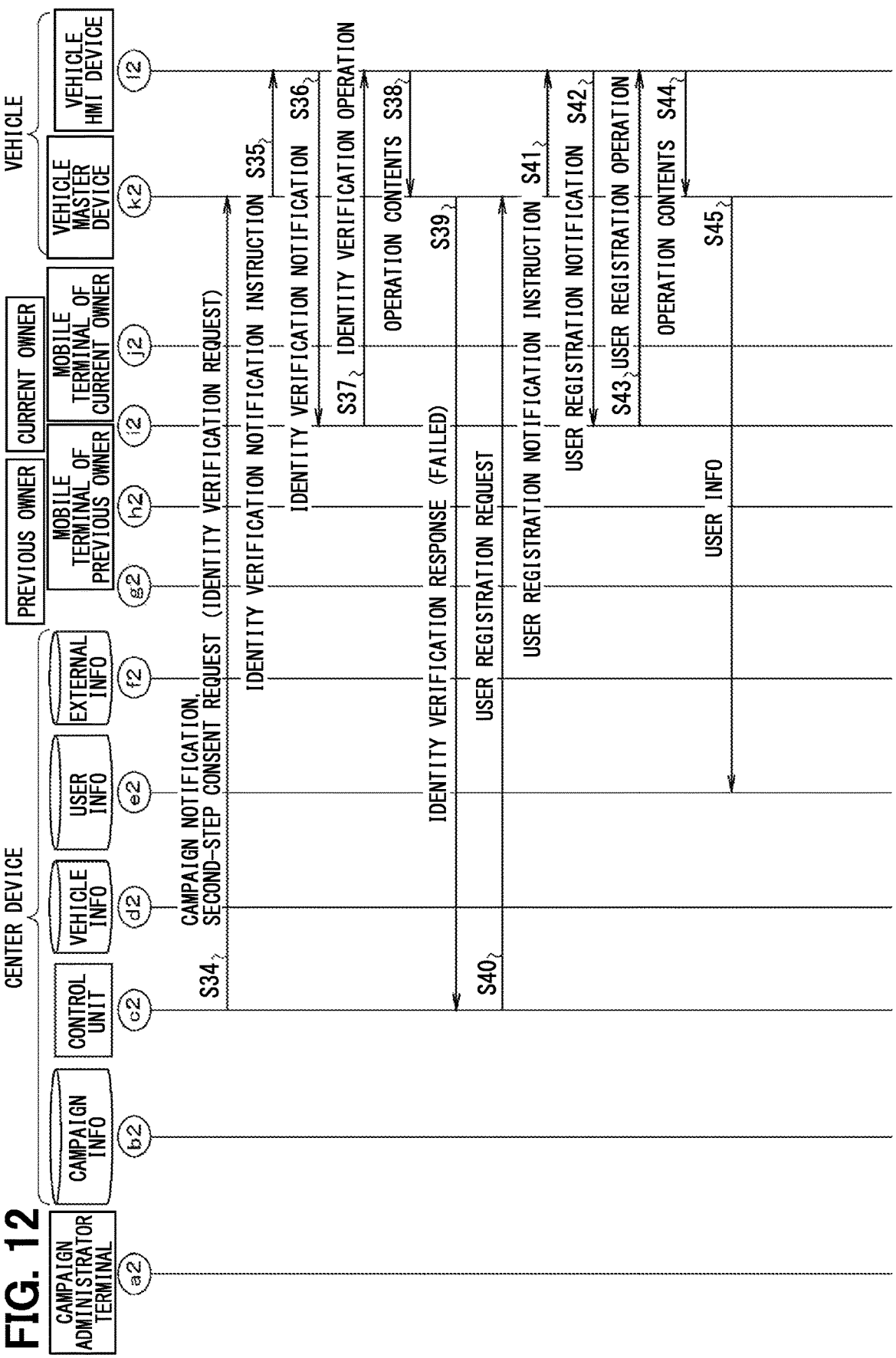
FIG. 12 is a diagram (No. 2) showing a flow of the process of the two-step consent.

As shown in FIGS. 11 and 12, when a vehicle is sold from a previous owner to a new owner for example, the ownership is changed (S25). In this case, at the center device 2, the control unit 14 periodically determines whether the two-step consent is needed based on the vehicle information and the external information (S28, S29). Since the ownership was changed and therefore the control unit 14 determines that at least one of the parking position, the traveling route, and the driving operation is changed, the control unit 14 determines that the two-step consent is needed. Since the user information stored in the user information storage unit 17 has not been updated at this point, the control unit 14 transmits the campaign notification and the first-step consent request to the mobile terminal 5 of the previous owner (S30).

When the mobile terminal 5 of the previous owner receives the campaign notification and the first-step consent request from the center device 2, the mobile terminal 5 notifies the previous owner of the campaign information (S31) and prompts the previous owner to permit whether to start downloading the reprogramming data. When the previous owner permits the first-step consent request and selects to allow the reprogramming data to be downloaded (S32), the mobile terminal 5 of the previous owner transmits the first-step consent response as a permission to the center device 2 (S33).

At the center device 2, when the control unit 14 receives the first-step consent response from the mobile terminal 5 of the previous owner and determines that the received first-step consent response indicates a permission, the control unit 14 distributes the campaign notification and the second-step consent request (the identity verification request) to the vehicle master device 7 to make the identity verification request (S34) since the two-step consent is determined to be needed at this point.

When the vehicle master device 7 receives the campaign notification and the second-step consent request (the identity verification request) from the center device 2, the vehicle master device 7 transmits an identity verification notification instruction to the vehicle HMI device 12 (S35), notifies the current owner of the identity verification (S36), and prompts the current owner to perform an identity verification operation such as inputting a security code (S37). In this case, since the security code is transmitted to the mobile terminal 5 of the previous owner, the current owner cannot input the correct security code. If the current owner cannot input the correct security code and thus a timeout occurs, if the current owner selects a button indicating "please select here if you are not notified of a security code," or if the current owner inputs an incorrect security code, the vehicle HMI device 12 transmits this operation to the vehicle master device 7. When the vehicle master device 7 receives the user's operation from the vehicle HMI device 12, the vehicle master device 7 transmits the identity verification response as a failure to the center device 2 (S39).

At the center device 2, when the control unit 14 receives the identity verification response transmitted from the vehicle master device 7 and determines that the received identity verification response is a failure, the control unit 14 transmits a user registration request to the vehicle master device 7 (S40). When the vehicle master device 7 receives the user registration request transmitted from the center device 2, the vehicle master device 7 transmits a user registration notification instruction to the vehicle HMI device 12 (S41), notifies the current owner of the user registration (S42), and prompts the current owner to register user information (S43). When the current owner registers the user information, the vehicle HMI device 12 transmits this operation content to the vehicle master device 7 (S44). When the vehicle master device 7 receives the operation content from the vehicle HMI device 12, the vehicle master device 7 transmits the user information to the center device 2 (S45).

At the center device 2, upon receiving the user information transmitted from the vehicle master device 7, the control unit 14 stores the received user information in the user information storage unit 17 and updates the user information. By updating the user information, the telephone number of the mobile terminal 5 is updated from the previous owner to the current owner.

(2-3) When the Owner of the Vehicle has Changed and the Previous Owner Rejects Distribution of Reprogramming Data.

Figure 13:
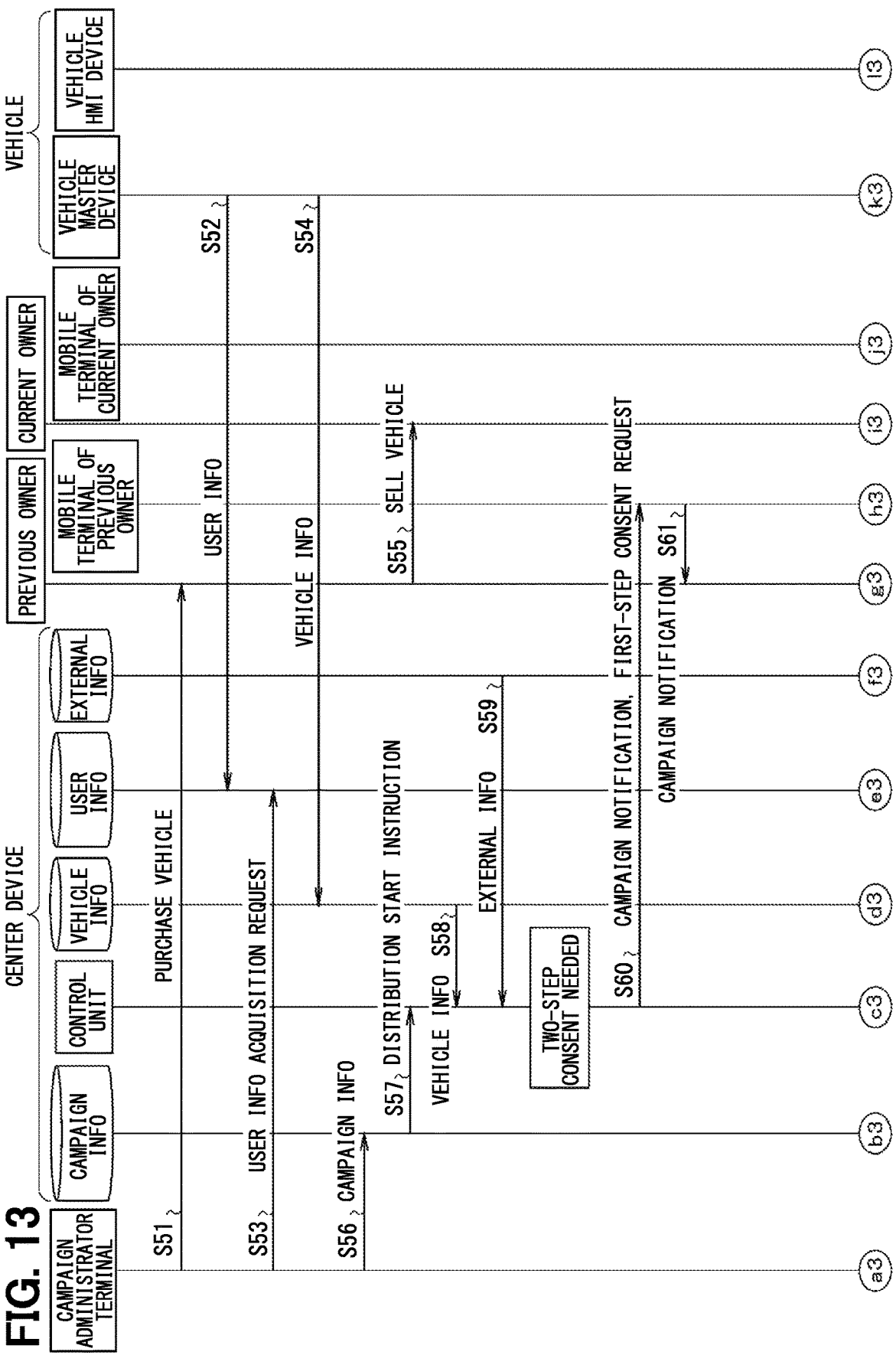
FIG. 13 is a diagram (No. 3) showing a flow of the process of the two-step consent.

As shown in FIGS. 13 and 14, when the mobile terminal 5 receives the campaign notification and the first-step consent request from the center device 2, the mobile terminal 5 notifies the previous owner of the campaign information (S61) and prompts the previous owner to permit whether to start downloading the reprogramming data. The mobile terminal 5 of the previous owner does not transmit the first-step consent response to the center device 2 if the current owner does not operate in response to the campaign information notification.

At the center device 2, even when the control unit 14 does not receive the first-step consent response from the mobile terminal 5, the control unit 14 distributes the campaign notification and the second-step consent request (the identity verification request) to the vehicle master device 7 to make the identity verification request (S62) since the two-step consent is determined to be needed at this point. Thereafter, upon receiving the user information transmitted from the vehicle master device 7, the control unit 14 stores the received user information in the user information storage unit 17 and updates the user information.

As described above, at the center device 2, when the control unit 14 determines that the owner of the vehicle has been changed, the control unit 14 determines that the two-step consent is needed. Then, after transmitting the campaign notification and the first-step consent request to the mobile terminal 5 of the previous owner, the control unit 14 transmits the campaign notification and the second-step consent request (the identity verification request) to the vehicle master device 7 regardless of whether the first-step consent response from the mobile terminal 5 of the previous owner is a permission or not. That is, even if the previous owner permits distribution of the reprogramming data, the distribution of the reprogramming data will not be allowed. Then, when the control unit 14 determines that the identity verification response transmitted from the vehicle master device 7 is false, the control unit 14 transmits the user registration request to the vehicle master device 7, and when the control unit 14 receives the user information transmitted from the vehicle master device 7, the control unit 14 stores the received user information in the user information storage unit 17 and updates the user information. Thereafter, since the control unit 14 updates the user information, the control unit 14 transmits the campaign notification and the first-step consent request to the mobile terminal 5 of the current owner.

In the above-embodiment, the owner change is determined by determining whether there is a change in the vehicle state and then the necessity of the two-step consent is determined. However, the two-step consent may be performed under another situation in addition to the above-described situation where the owner of the vehicle is changed. For example, the necessity of the two-step consent may be determined by judging an elapsed time from when the reprogramming data was distributed last time to when the distribution event for the reprogramming data is established this time or by determining whether fees are incurred for distributing the reprogramming data this time.

In a case where the necessity determination unit 14d judges the elapsed time from when the reprogramming data was distributed last time to when the distribution event for the reprogramming data was established this time, if the unit 14d determines that the elapsed time does not exceed a predetermined time (for example, several months), the unit 14d determines that the two-step consent is not needed. On the contrary, if the unit 14d determines that the elapsed time exceeds the predetermined time, the unit 14d determines that the two-step consent is needed. That is, if the elapsed time from the time of the distribution of the previous reprogramming data to the time of occurrence of the distribution event for the current reprogramming data exceeds the predetermined time, there is a concern that the owner might forget the purpose and/or importance of distributing the reprogramming data. Therefore, in order to remind the owner of the purpose and/or importance of distributing the reprogramming data, the two-step consent may be performed.

Further, if the necessity determination unit 14d determines whether fees for distributing the current reprogramming data are incurred and if the unit 14d determines that there are no fees for distribution, the unit 14d may determine that the two-step consent is not needed. On the contrary, if the unit 14d determines that fees are incurred for the distribution, the unit 14d may determine that the two-step consent is needed. That is, if a charge is incurred for distributing the reprogramming data this time, a financial burden will be incurred because of the charge, and therefore the two-step consent may be required in order to make the owner aware of the financial burden.

In this case, as shown in FIGS. 15 and 16, at the center device 2, the control unit 14 transmits the campaign notification and the first-step consent request to the mobile terminal 5 of the current owner (S89). When the mobile terminal 5 of the current owner receives the campaign notification and the first-step consent request from the center device 2, the mobile terminal 5 notifies the current owner of the campaign information (S90) and prompts the owner to permit whether to start downloading the reprogramming data. When the current owner selects to allow the reprogramming data to be downloaded (S91), the mobile terminal 5 of the current owner transmits the first-step consent response as a permission to the center device 2 (S92).

At the center device 2, when the control unit 14 receives the first-step consent response from the mobile terminal 5 of the current owner and determines that the received first-step consent response is a permission, the control unit 14 distributes the campaign notification and the second-step consent request (the identity verification request) to the vehicle master device 7 to make the identity verification request (S93). When the vehicle master device 7 receives the campaign notification and the second-step consent request (the identity verification request) from the center device 2, the vehicle master device 7 transmits an identity verification notification instruction to the vehicle HMI device 12 (S94), notifies the current owner of the identity verification (S95), and prompts the current owner to input a security code (S96). In this case, since the security code is transmitted to the mobile terminal 5 of the current owner, the current owner can input the correct security code. When the current owner inputs the correct security code, the vehicle HMI device 12 transmits this operation content to the vehicle master device 7 (S37). When the vehicle master device 7 receives the user's operation from the vehicle HMI device 12, the vehicle master device 7 transmits the identity verification response as a truth to the center device 2 (S98).

At the center device 2, when the control unit 14 receives the identity verification response transmitted from the vehicle master device 7 and determines that the received identity verification response is a truth, the control unit 14 transmits reprogramming data to the vehicle master device 7 (S99).

As described above, the present embodiment may provide the following technical advantages. At the center device 2, the consent request is made to the mobile terminal 5 and the vehicle HMI device 12 in steps, and distribution of reprogramming data to a vehicle is controlled according to a determination result of a permission response from the mobile terminal 5 and the vehicle HMI device 12. For example, it is possible to avoid a situation where, when an owner of a vehicle is changed and the previous owner permits distribution of reprogramming data, the distribution of the reprogramming data is started according to the permission by the previous owner. As a result, it is possible to avoid the situation where distribution of reprogramming data is started even though the current owner of the vehicle does not permit the distribution of the reprogramming data, and thus it is possible to appropriately distribute the reprogramming data from the center device 2 to a vehicle.

The center device is configured to determine whether the two-step consent is needed and is configured to decide which of the one-step consent or the two-step consent should be performed according to a determination result. If only the one-step consent is always performed, the problem that occurs when the owner is changed would not be solved, for example. On the other hand, if the two-step consent is always performed, the burden on the owner would unnecessarily increase. However, by selectively using the one-step consent and the two-step consent, it is possible to solve the problem that occurs when the owner is changed while avoiding a situation where the burden on the owner is unnecessarily increased.

The center device is configured to make a permission request to the mobile terminal 5 when performing the one-step consent after the center device determines that the two-step consent is not needed. If the one-step consent is made via the vehicle HMI device 7, the owner is only given an opportunity to make a consent response during the ride of the vehicle, but by making the one-step consent to the mobile terminal 5, the owner can make a permission response when the owner is in possession of the mobile terminal 5 as well as when the owner is riding, which can increase the degree of freedom of the opportunity to make the consent response.

When the one-step consent is performed, the center device is configured to distribute reprogramming data upon determining that the permission response from the mobile terminal 5 indicates a permission. Thus, the user can start distributing the reprogramming data simply by operating the mobile terminal 5.

When the two-step consent is determined to be needed and the two-step consent is performed, the first-step consent request is made to the mobile terminal 5 and the second-step consent request is made to the vehicle HMI device 7. If the first-step consent request is made to the vehicle HMI device 7, the user would be given an opportunity to make the first-step consent response only during the ride of the vehicle. However, by making the one-step consent to the mobile terminal 5, the user can make the first-step consent response when the user is in possession of the mobile terminal 5, which can increase the degree of freedom of the opportunity to make the first-step consent response.

When the two-step consent is performed, by making an identity verification request to the vehicle HMI device 7, the second-step consent request is made to the vehicle HMI device 7. Then, if the identity verification response from the vehicle HMI device 7 is determined to be true, reprogramming data is distributed. Thus, the user can start distributing the reprogramming data by operating the vehicle HMI device 7 after operating the mobile terminal 5.

When the two-step consent is performed, and if the consent response from the vehicle HMI device 7 is determined to be false, the registration request for the user information is made to the vehicle HMI device 7. Thus, the owner can be prompted to register the user information when the identity verification response from the vehicle HMI device 7 is false.

As a change in the vehicle state, a change in the parking position, a change in the traveling route, and a change in the driving operation are monitored, and the center device is configured to determine whether the two-step consent is needed based on a determination result. Thus, it is possible to determine whether the owner has been changed from at least one of a change in the parking position, a change in the traveling route, and a change in the driving operation.

For example, the necessity of the two-step consent is determined by determining an elapsed time from when the reprogramming data was distributed last time to when the distribution event for the reprogramming data was established this time. Then, the necessity of the two-step consent is determined based on a determination result. Accordingly, even when the owner has not been changed, if the elapsed time from the time of the distribution of the previous reprogramming data to the time of occurrence of the distribution event for the current reprogramming data exceeds the predetermined time, there is a concern that the owner might forget the purpose and/or importance of distributing the reprogramming data. By performing the two-step consent, the owner can be made to recognize the purpose and significance of the distribution of reprogramming data again, and it is possible to avoid a situation where the owner easily permits the distribution of the reprogramming data.

The center device is configured to determine whether a charge for distributing the reprogramming data will be incurred and is configured to determine whether the two-step consent is needed based on a determination result. Even if the owner has not been changed, if fees are incurred for distributing the reprogramming data, a financial burden would incur on the owner due to the charge. By performing the two-step consent, the owner can be made to recognize that fees would be incurred, and it is possible to avoid a situation where the owner easily permits the distribution of the reprogramming data.

Although the present disclosure has been described in accordance with the examples, it is understood that the present disclosure is not limited to such examples or structures. The present disclosure encompasses various modifications and variations within the scope of equivalents. Additionally, various combinations and configurations, as well as other combinations and configurations including more, less, or only a single element, are within the scope and spirit of the present disclosure.

The necessity of the two-step consent may be determined based on a type of data distributed from the center device 2 to the vehicle. For example, when a distribution event for reprogramming data with extremely high urgency or importance is established, the reprogramming data may be distributed without determining whether the two-step consent is needed.

When the consent request is made to the mobile terminal 5 and the vehicle HMI device 12, the consent request is not necessarily made step-by-step, and the consent request may be made to both the mobile terminal 5 and the vehicle HMI device 12 at the same time. That is, at the center device 2, the consent request may be made to the mobile terminal 5 and the vehicle HMI device 12 at the same time, and distribution of reprogramming data may be allowed when the consent response from the mobile terminal 5 and the consent response from the vehicle HMI device 12 indicate a permission.

When the consent requests are made step-by-step, the two-step consent is not necessarily made, but a three-or-more step consent may be made. When making the consent requests step-by-step, the identity verification is performed using a security code. However, the identity verification may be performed without the security code. For example, a keyword is registered in advance together with user information, and the identity verification may be made by comparing the registered keyword and a keyword input by the user at the time of the identity verification.

Data distributed from the center device 2 to vehicles is not necessarily limited to reprogramming data for updating an application program of an ECU, and may be map data or the like.

Not necessarily limited to the situation where an owner is changed, the present disclosure may be applied to a usage pattern where a vehicle is temporarily rented to another person without owner change.

The campaign notification screen, download permission screen, security code notification screen, security code input screen, download permission screen, and user registration guidance screen may be displayed in any manner as long as the owner can perform a desired operation . . . .

The control units and methods described in the present disclosure may be implemented by a special purpose computer provided by configuring a memory and a processor programmed to execute one or more functions embodied by a computer program. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer program may also be stored on a computer readable non-transitory tangible recording medium as instructions to be executed by a computer.

What is claimed is:

1. A center device, comprising:
at least one processor; and
at least one memory storing computer program code, wherein
the computer program code, when executed by the at least one processor, causes the at least one processor to:
 make a consent request to a plurality of devices for data distribution to a vehicle;
 judge a consent response from each of the plurality of devices;
 control the data distribution to the vehicle according to a determination result of the consent response; and
 determine whether the consent request to the plurality of devices is needed before the consent request is made to the plurality of devices, wherein
the computer program code further causes the at least one processor:
 determine whether to make the consent request to the plurality of devices according to a determination result of the consent request,
 make the consent request to at least a first device and a second device among the plurality of devices upon determining that the consent request to the plurality of devices is needed, and
 perform the data distribution to the vehicle upon determining that at least the consent response from the first device and the consent response from the second device indicate a permission.

2. The center device according to claim 1, wherein
the computer program code further causes the at least one processor to:
 make the consent request only to the first device among the plurality of devices upon determining that the consent request to the plurality of devices is not needed, and perform the data distribution to the vehicle upon determining that the consent response from the first device indicates a permission.

3. A center device, comprising:
at least one processor; and
at least one memory storing computer program code, wherein
the computer program code, when executed by the at least one processor, causes the at least one processor to:
 make a consent request to a plurality of devices for data distribution to a vehicle;
 judge a consent response from each of the plurality of devices;
 control the data distribution to the vehicle according to a determination result of the consent response; and
 determine whether the consent request to the plurality of devices is needed before the consent request is made to the plurality of devices, wherein
the computer program code further causes the at least one processor to:
 determine whether to make the consent request to the plurality of devices according to a determination result of the consent request, and
 make the consent request to a first device and a second device among the plurality of devices in steps by making a first-step consent request to the first device and then making a second-step consent request to the second device.

4. The center device according to claim 3, wherein
the computer program code further causes the at least one processor to:
make an identity verification request, as the second-step consent request, to the second device.

5. The center device according to claim 4, wherein
the computer program code further causes the at least one processor to:
 judge an identity verification response from the second device, and
 perform the data distribution to the vehicle upon determining that the identity verification response from the second device is true.

6. The center device according to claim 5, wherein
the computer program code further causes the at least one processor to:
 make a registration request for user information to the second device upon determining that the identity verification response from the second device is false.

7. The center device according to claim 1, wherein
the computer program code further causes the at least one processor to:
 determine whether there is a change in a vehicle state; and
 determine whether the consent request to the plurality of devices is needed based on a determination result of the change in the vehicle state.

8. A center device, comprising:
at least one processor; and
at least one memory storing computer program code, wherein
the computer program code, when executed by the at least one processor, causes the at least one processor to:
 make a consent request to a plurality of devices for data distribution to a vehicle;
 judge a consent response from each of the plurality of devices;
 control the data distribution to the vehicle according to a determination result of the consent response; and
 determine whether the consent request to the plurality of devices is needed before the consent request is made to the plurality of devices, wherein
the computer program code further causes the at least one processor to:
 determine whether to make the consent request to the plurality of devices according to a determination result of the consent request;
 determine whether there is a change in a vehicle state;
 determine whether the consent request to the plurality of devices is needed based on a determination result of the change in the vehicle state; and
 determine whether there is a change, as the change in the vehicle state, in at least one of a parking position, a traveling route, and a driving operation.

9. The center device according to claim 1, wherein
the computer program code further causes the at least one processor to:
 monitor an elapsed time from when the data distribution was performed last time to when a distribution event for the data distribution this time was established; and
 determine whether the consent request to the plurality of devices is needed based on the elapsed time.

10. The center device according to claim 1, wherein
the computer program code further causes the at least one processor to:
 determine whether a charge for the data distribution will be incurred; and
 determine whether the consent request to the plurality of devices is needed based on a determination result of whether the charge will be incurred.

11. The center device according to claim 1, wherein
the computer program code further causes the at least one processor to:
 make the consent request to the plurality of devices that include a mobile terminal carried by a user and a vehicle HMI device mounted in the vehicle.

12. A data distribution system, comprising:
a center device having at least one processor and memory configured to:
 make a consent request to a plurality of devices for data distribution to a vehicle;
 judge a consent response from each of the plurality of devices;
 control the data distribution to the vehicle according to a determination result of the consent request; and
 determine whether the consent request to the plurality of devices is needed before the consent request is made to the plurality of devices;
wherein the plurality of devices are each configured to make the consent response in response to the consent request from the center device;
wherein the at least one processor and memory of the center device are further configured to determine whether to make the consent request to the plurality of devices according to a determination result of whether the consent request to the plurality of devices is needed; and
wherein the at least one processor and memory of the center device are further configured to:
 make the consent request to at least a first device and a second device among the plurality of devices upon determining that the consent request to the plurality of devices is needed; and
 perform the data distribution to the vehicle upon determining that at least the consent response from the first device and the consent response from the second device indicate a permission.

13. A non-transitory, computer readable storage medium storing a computer program for distribution control, the computer program comprising instructions which cause a center device to perform:
   a consent request step of making a consent request to a plurality of devices for data distribution to a vehicle;
   a consent determination step of judging a consent response from each of the plurality of devices;
   a distribution control step of controlling the data distribution to the vehicle based on a determination result at the consent determination step; and
   a necessity determination step of determining whether the consent request to the plurality of devices is needed before the consent request is made to the plurality of devices, wherein
   the consent request step further includes determining whether to make the consent request to the plurality of devices according to a determination result at the necessity determination step, wherein
   the consent request step further includes making the consent request to at least a first device and a second device among the plurality of devices upon determining that the consent request to the plurality of devices is needed, and
   the distribution control step further includes performing the data distribution to the vehicle upon determining that at least the consent response from the first device and the consent response from the second device indicate a permission.

14. A data distribution system, comprising:
   a center device having at least one processor and memory configured to:
      make a consent request to a plurality of devices for data distribution to a vehicle;
      judge a consent response from each of the plurality of devices;
      control the data distribution to the vehicle according to a determination result of the consent request; and
      determine whether the consent request to the plurality of devices is needed before the consent request is made to the plurality of devices;
   wherein the plurality of devices are each configured to make the consent response in response to the consent request from the center device;
   wherein the at least one processor and memory of the center device are further configured to determine whether to make the consent request to the plurality of devices according to a determination result of whether the consent request to the plurality of devices is needed; and
   wherein the at least one processor and memory of the center device are further configured to:
      make the consent request to a first device and a second device among the plurality of devices in steps by making a first-step consent request to the first device and then making a second-step consent request to the second device.

15. A non-transitory, computer readable storage medium storing a computer program for distribution control, the computer program comprising instructions which cause a center device to perform:
   a consent request step of making a consent request to a plurality of devices for data distribution to a vehicle;
   a consent determination step of judging a consent response from each of the plurality of devices;
   a distribution control step of controlling the data distribution to the vehicle based on a determination result at the consent determination step; and
   a necessity determination step of determining whether the consent request to the plurality of devices is needed before the consent request is made to the plurality of devices, wherein
   the consent request step further includes determining whether to make the consent request to the plurality of devices according to a determination result at the necessity determination step, wherein
   the consent request step further includes making the consent request to a first device and a second device among the plurality of devices in steps by making a first-step consent request to the first device and then making a second-step consent request to the second device.

* * * * *